(12) United States Patent
Ford (10) Patent No.: US 10,406,896 B2
(45) Date of Patent: Sep. 10, 2019

(54) RETRACTABLE HARD PANEL COVER AND ASSOCIATED STORAGE CONTAINER

(71) Applicant: Rollie R. Ford, Georgetown, TX (US)

(72) Inventor: Rollie R. Ford, Georgetown, TX (US)

(*) Notice: Subject to any disclaimer, the term of this patent is extended or adjusted under 35 U.S.C. 154(b) by 0 days.

(21) Appl. No.: 15/832,425

(22) Filed: Dec. 5, 2017

(65) Prior Publication Data

US 2018/0154748 A1   Jun. 7, 2018

Related U.S. Application Data

(60) Provisional application No. 62/497,817, filed on Dec. 5, 2016.

(51) Int. Cl.
| | |
|---|---|
| *B60J 7/04* | (2006.01) |
| *B60J 7/19* | (2006.01) |
| *B60J 7/20* | (2006.01) |
| *B60R 5/04* | (2006.01) |
| *B60P 7/02* | (2006.01) |
| *B60L 8/00* | (2006.01) |
| *B60R 11/06* | (2006.01) |

(52) U.S. Cl.
CPC ............... *B60J 7/041* (2013.01); *B60J 7/196* (2013.01); *B60J 7/20* (2013.01); *B60R 5/04* (2013.01); *B60L 8/003* (2013.01); *B60P 7/02* (2013.01); *B60R 11/06* (2013.01)

(58) Field of Classification Search
CPC .................................. B60J 7/041; B60J 7/042
USPC ........................................ 296/100.03, 100.09
See application file for complete search history.

(56) References Cited

U.S. PATENT DOCUMENTS

| 2,672,192 | A | * | 3/1954 | Goldner | E06B 9/0638 |
| | | | | | 160/235 |
| 3,649,072 | A | * | 3/1972 | Cross | B60J 7/041 |
| | | | | | 296/100.03 |
| 4,776,629 | A | * | 10/1988 | Cross | B60J 7/041 |
| | | | | | 160/32 |
| 4,784,429 | A | * | 11/1988 | Hodges | B60J 7/041 |
| | | | | | 160/202 |
| 5,087,093 | A | * | 2/1992 | Repetti | B60J 7/141 |
| | | | | | 296/100.09 |
| 5,251,950 | A | * | 10/1993 | Bernardo | B60J 7/041 |
| | | | | | 296/100.03 |
| 2002/0021019 | A1 | * | 2/2002 | Bohm | B60J 7/041 |
| | | | | | 296/100.02 |

(Continued)

*Primary Examiner* — Jason S Morrow
(74) *Attorney, Agent, or Firm* — Craige Thompson; Thompson Patent Law (57) ABSTRACT

Apparatus and associated methods relate to a storage container and storage container lid configured for stowage and extraction of panels, the panels having complementary mating interfaces that cause the panels to stack onto one another as the panels enter the storage container lid, and to couple to one another as the panels are extracted from the storage container lid. In an illustrative example, the mating interface for the panels may include a first linearly decreasing section, a linearly increasing section, and a second linearly decreasing section that complements the mating interface of an adjacent panel. The panels may slide along a channel into and out of an opening in the storage container lid. A panel storage system may advantageously store panels in the lid of the storage container, while still providing access to the contents of the storage container by opening of the lid.

19 Claims, 8 Drawing Sheets

(56) References Cited

U.S. PATENT DOCUMENTS

| | | | | |
|---|---|---|---|---|
| 2010/0308617 A1* | 12/2010 | Golden | ................... | B60J 7/041 296/39.2 |
| 2013/0328348 A1* | 12/2013 | Agnew | ................. | B60K 16/00 296/136.03 |
| 2014/0312646 A1* | 10/2014 | Copp | ...................... | B60J 7/196 296/100.12 |

* cited by examiner

RETRACTABLE HARD PANEL COVER AND ASSOCIATED STORAGE CONTAINER

CROSS-REFERENCE TO RELATED APPLICATIONS

This application claims the benefit of U.S. Provisional Application Ser. No. 62/497,817 titled "Best pickup toolbox," filed by Rollie Ford on Dec. 5, 2016.

This application incorporates the entire contents of the foregoing application(s) herein by reference.

TECHNICAL FIELD

Various embodiments relate generally to storage containers.

BACKGROUND

Trucks are popular vehicles for performing rugged tasks such as towing, hauling, and transporting cargo. Trucks vary greatly in size, power, and configuration. For example, some trucks run on gasoline, while other trucks run on diesel fuel. A defining feature of trucks is that they typically have a cargo hold (e.g., a truck bed), which may be used to transport large and heavy items across long distances.

Truck bed covers may be used to cover the bed of a truck to protect it from weathering. Truck bed covers may come pre-installed by an original equipment manufacturer (OEM), or may be purchased post-sale. Some truck bed covers may be made of a hard and rigid material (e.g., hard plastic), while other truck bed covers may be made of a soft or flexible material.

Trucks may also be fitted with containers for storing various items. For example, a truck may have a toolbox installed in the front-most section of the truck bed. Truck toolboxes may be made of a durable, hard material (e.g., aluminum, stainless steel). Truck toolboxes may be manufactured to withstand significant weathering effects, as they may be continually exposed to outdoor weather conditions over an extended period of time.

SUMMARY

Apparatus and associated methods relate to a storage container and storage container lid configured for stowage and extraction of panels, the panels having complementary mating interfaces that cause the panels to stack onto one another as the panels enter the storage container lid, and to couple to one another as the panels are extracted from the storage container lid. In an illustrative example, the mating interface for the panels may include a first linearly decreasing section, a linearly increasing section, and a second linearly decreasing section that complements the mating interface of an adjacent panel. The panels may slide along a channel into and out of an opening in the storage container lid. A panel storage system may advantageously store panels in the lid of the storage container, while still providing access to the contents of the storage container by opening of the lid.

Various embodiments may achieve one or more advantages. For example, some embodiments may compactly combine the functions of a truck toolbox and a truck bed cover in a single apparatus. Panels may be efficiently stored in the lid of a storage container that may also operate as a thermally insulated container. In some embodiments, panels may have a unique mating interface that achieves the two objectives of: (1) releasably coupling adjacent panels to one another; and (2) moving the panels into a stacking relationship when the panels are inserted into a panel storage container. A truck bed covered with panels may beneficially result in improved gas mileage for the truck. Panels may include weatherproofing that may create a water-tight seal that may protect contents stored in a truck bed from water damage. Some embodiments may provide for a way to safely secure the contents stored within a truck bed from would-be thieves. In some examples, the panels may be hard and rigid so that heavy items may sit on the panels and be retained on the panels via tie downs located on opposing side rails. Stacking panels may advantageously allow for quick stowage of the panels and eliminate the need for folding panels.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
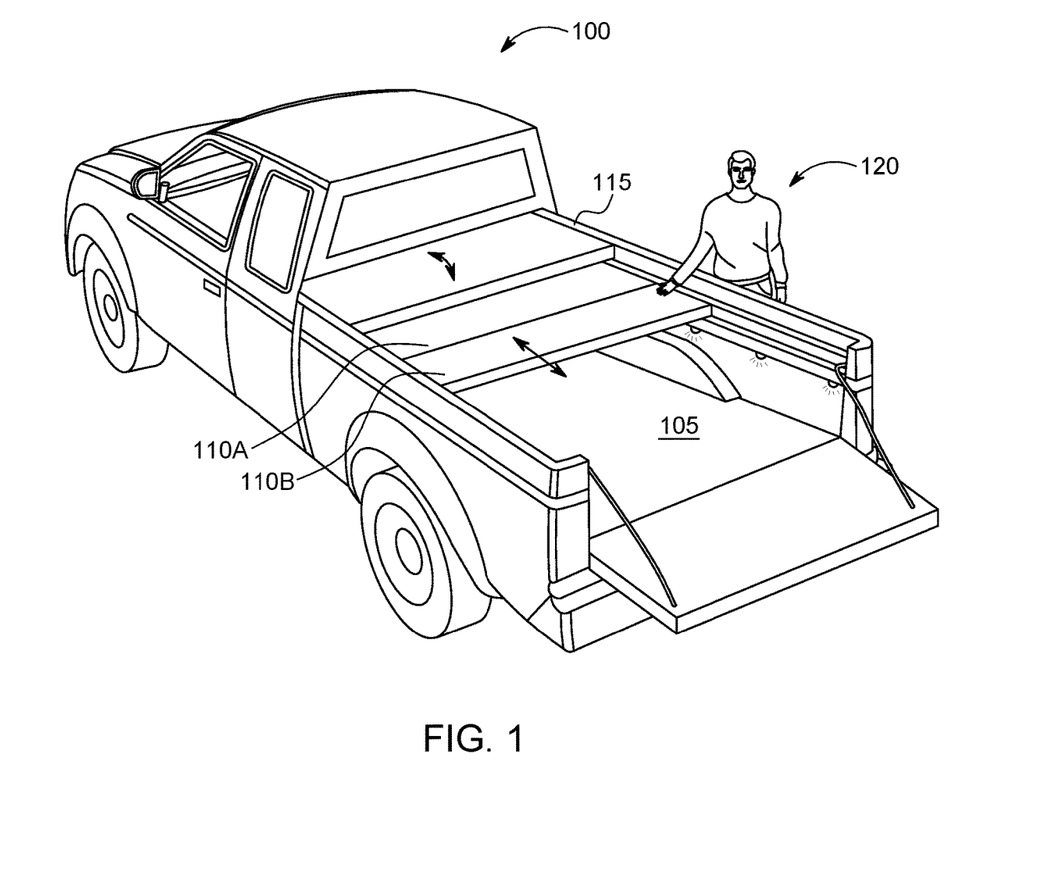
FIG. 1 depicts a perspective view of an exemplary truck bed cover panels and an exemplary truck bed toolbox on an exemplary pickup truck.

FIG. 1 depicts a perspective view of an exemplary truck bed cover panels and an exemplary truck bed toolbox on an exemplary pickup truck. A truck 100 has a truck bed 105. Partially covering the truck bed 105 are sliding panels 110A, 110B. The sliding panels 110A, 110B are configured to slide forward and backward relative to the truck bed 105. In a front section of the truck bed 105 is a toolbox 115. The toolbox 115 has a lid that is configured to rotate upward/downward to open/close the toolbox 115. A user 120 is actively sliding the sliding panels 110A, 110B, which are coupled to one another such that the sliding panels 110A, 110B translate forward and backward with one another. When the sliding panels 110A, 110B are slid in the forward direction, they enter the lid of the toolbox 115, where they can be stored.

Figure 2:
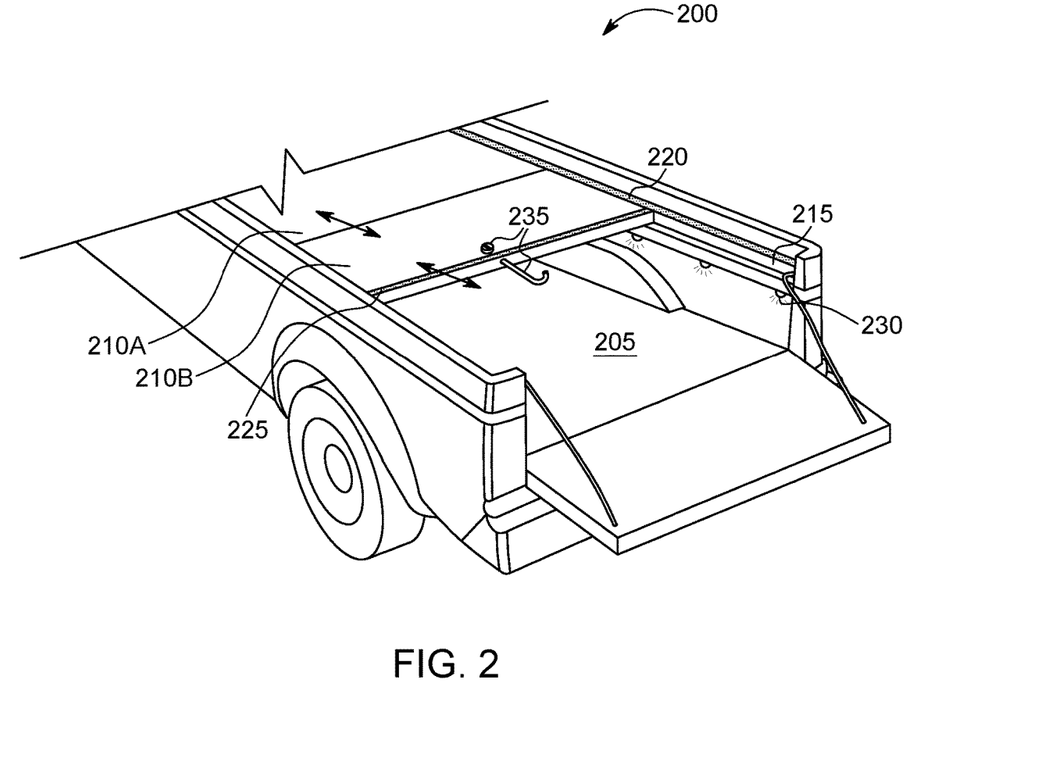
FIG. 2 depicts a perspective view of an exemplary slidable truck bed cover panels on an exemplary truck bed.

FIG. 2 depicts a perspective view of an exemplary slidable truck bed cover panels on an exemplary truck bed. A truck 200 includes a truck bed 205 that is partially covered by sliding panels 210A, 201B. The sliding panels 210A, 210B slide forward and backward within a longitudinal channel 215 located on a lateral side section of the truck 200. Along the channel 215 is channel weatherproofing 220. In some examples, the channel weatherproofing 215 may be a rubber-like material that is flexible and provides a water-tight seal with the tops of the sliding panels 210A, 210B. The sliding panel 210B also includes weatherproofing 225. The weatherproofing 225 may intimately engage with a tailgate (not shown) of the truck 200 to provide for a water-tight seal between the sliding panel 210B and the tailgate of the truck 200. Located adjacent to the longitudinal channels 215 are light sources 230.

It may be appreciated that an opposite side of the truck 200 may be a mirror image of the depicted section of the truck 200. For example, an opposing channel (not shown) may be aligned with the channel 215, so that the sliding panels 210A, 210B are supported by and slide within the opposing channels. The opposing channel (not shown) may also include weatherproofing (similar to the weatherproofing 220 of the channel 215).

Also shown in FIG. 2 is a locking mechanism 235 that may advantageously provide added security for items stored in the truck bed 205. In this exemplary embodiment, the locking mechanism 235 may be a key lock that actuates a hook that lockingly engages the inner area of a tailgate of the truck 200. A user may store items in the truck bed 205, extend the panels 210A, 210B to cover the entire truck bed 205, and then use a key to lock the panels 210A, 210B into place. This may provide a user with added comfort that the items stored in the truck bed 205 are adequately protected from would-be thieves.

Figure 3:
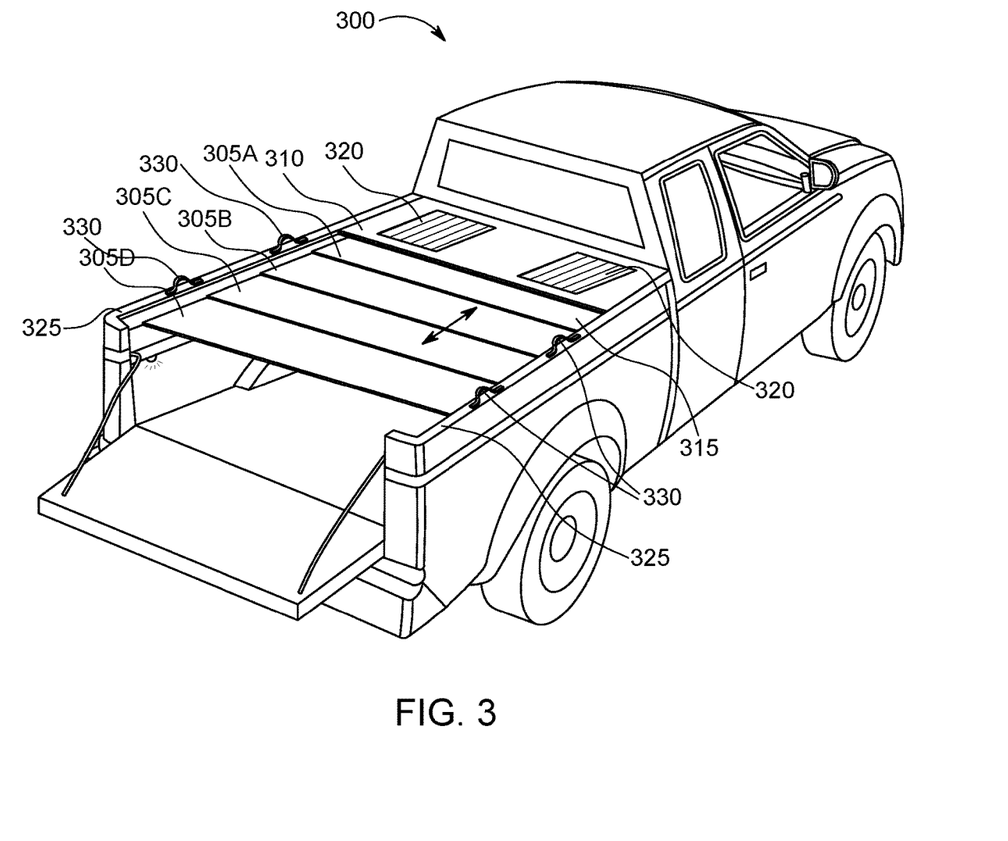
FIG. 3 depicts a perspective view of an exemplary truck bed cover panels configured to be stored inside of an exemplary lid of a storage container on an exemplary pickup truck.

FIG. 3 depicts a perspective view of an exemplary truck bed cover panels configured to be stored inside of an exemplary lid of a storage container on an exemplary pickup truck. A truck 300 is shown with sliding panels 305A, 305B, 305C, and 305D that may act as a cover for the bed of the truck 300. The sliding panels 305A-D are configured to slide within a lid 310 of a storage container via an opening 315. The opening 315 has a width-wise dimension that is greater than or equal to the width-wise dimension of the sliding panels 305A-D, such that the opening is sized to sequentially receive the sliding panels 305A-D.

The lid 310 of the storage container includes solar panels 320. The solar panels 320 may charge an energy storage device (e.g., a battery) using sunlight. The energy storage device may power various devices. For example, the energy storage device may power the light sources 230 shown in FIG. 2. In some examples, the storage container may be a solar powered refrigerated container that may be powered by the energy storage device.

Also shown in FIG. 3 are opposing side rails 325 along which the sliding panels 305A-D slide. The side rails 325 lie on top of the side walls of the bed of the truck 300. The side rails 325 may be modular, so that the side rails 325 are separate from the truck 300 while still being configured to fixedly attach to the top of the side walls of the bed of the truck 300. The side rails 325 may include channels that facilitate forward and backward sliding of the panels 305A-D. The opposing side rails 325 include several tie downs 330 that may secure loads either with the panels 305A-D extended or retracted into the lid 310.

Figure 4:
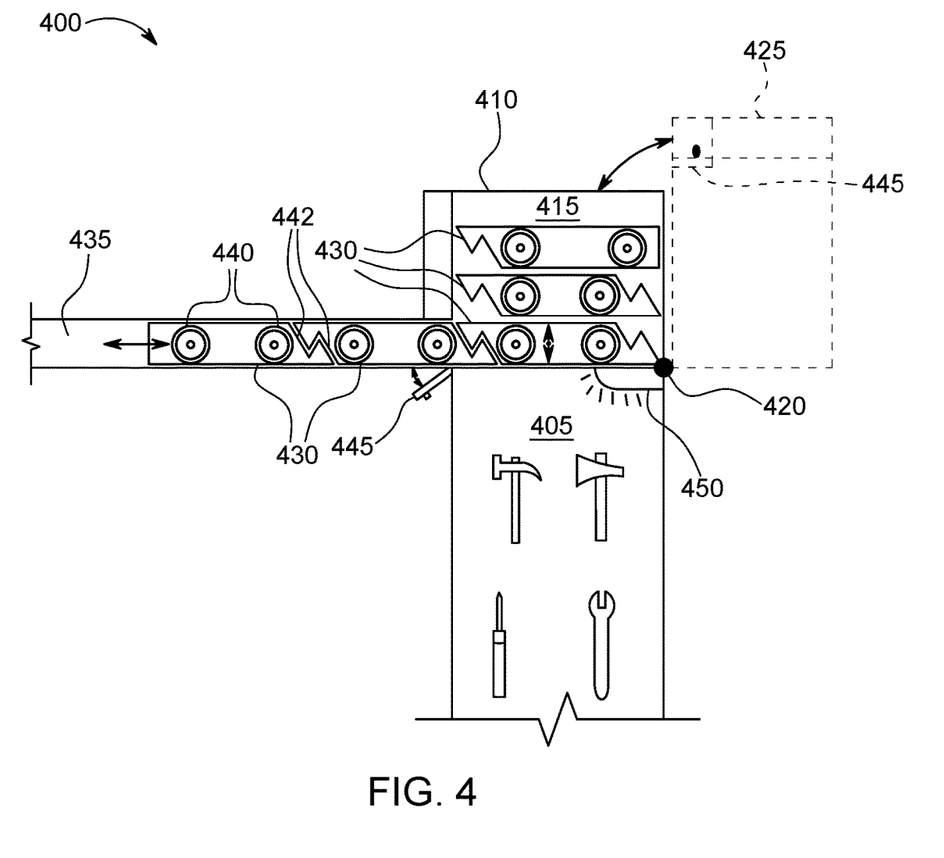
FIG. 4 depicts a side cross-sectional view of an exemplary toolbox with a toolbox lid configured to store multiple panels.

FIG. 4 depicts a side cross-sectional view of an exemplary toolbox with a toolbox lid configured to store multiple panels. A toolbox 400 includes a main storage section 405. In this exemplary embodiment, the main storage section 405 stores multiple tools (e.g., a screwdriver, wrench, and hammer). The toolbox 400 also includes a lid 410. The lid 410 includes a hollow panel storage section 415. The lid 410 is hingedly coupled to the rest of the toolbox 400 at a hinge point 420. The hinge point 420 allows the lid 410 to be in an open position (e.g., open lid 425) or a closed position (e.g., closed lid 410).

Stored within the lid 410 are multiple panels 430. The panels 430 are configured to slide in and along a channel 435. To help smooth the sliding of the panels 430 within the channel 435, at least one roller 440 (e.g., bearing(s) or wheel(s)) is located on the opposing sides of each panel 430. The rollers 440 may aid in minimizing the friction and wear to the panels 430 when they slide in the channel 435. The rollers 440 may also be advantageously configured to support a heavy load placed on top of the panels 430 while the panels are supported in the channel 435. As the panels 430 slide inside of the hollow panel storage section 415 of the lid 410, the interfaces 442 between consecutive panels 430 cause the panels to stack on top of one another inside of the hollow panel storage section 415. More specifically, the right inclined section of the interface 442 of a first panel may force up the left section of a second (adjacent) panel, which may cause the second panel to be pushed up on top of the first panel in a stacking relationship. As the panels 430 are pushed into the lid 410, each panel stacks sequentially on top of the next panel, such that all of the panels 430 may be stored within the hollow panel storage section 415 of the lid 410. After all of the panels 430 are stored within the hollow panel storage section 415, a door 445 may close the opening to the hollow panel storage section 415.

To extract the panels 430 from the hollow panel storage section 415, an end panel is initially pulled out of the hollow panel storage section 415. As the end panel translates to the left inside of the channel 435 and out from under a panel stacked on top of the end panel (e.g., a "stacked panel"), the stacked panel may be forced down due to the gravitational force acting on the panel. Once the end panel has moved out from under the stacked panel, the interface 442 of the stacked panel may fall into and mate with the interface 442 of the end panel to couple the two panels with one another. This process repeats itself for each consecutive panel, such that each panel that is moved out from under its corresponding stacked panel may couple with the previously stacked panel via the interfaces 442. This coupling between the interfaces 442 may allow the panels to translate with one another within the channel 435.

Located on an under side of the lid 410 is a light 450. The light 450 may aid in illuminating the main storage section 405. The light 450 may be powered (directly or indirectly) by the solar panels 320 shown in FIG. 3. The light 450 may be configured to turn on when the lid 410 is in an open position (e.g., open lid 425).

Figure 5:
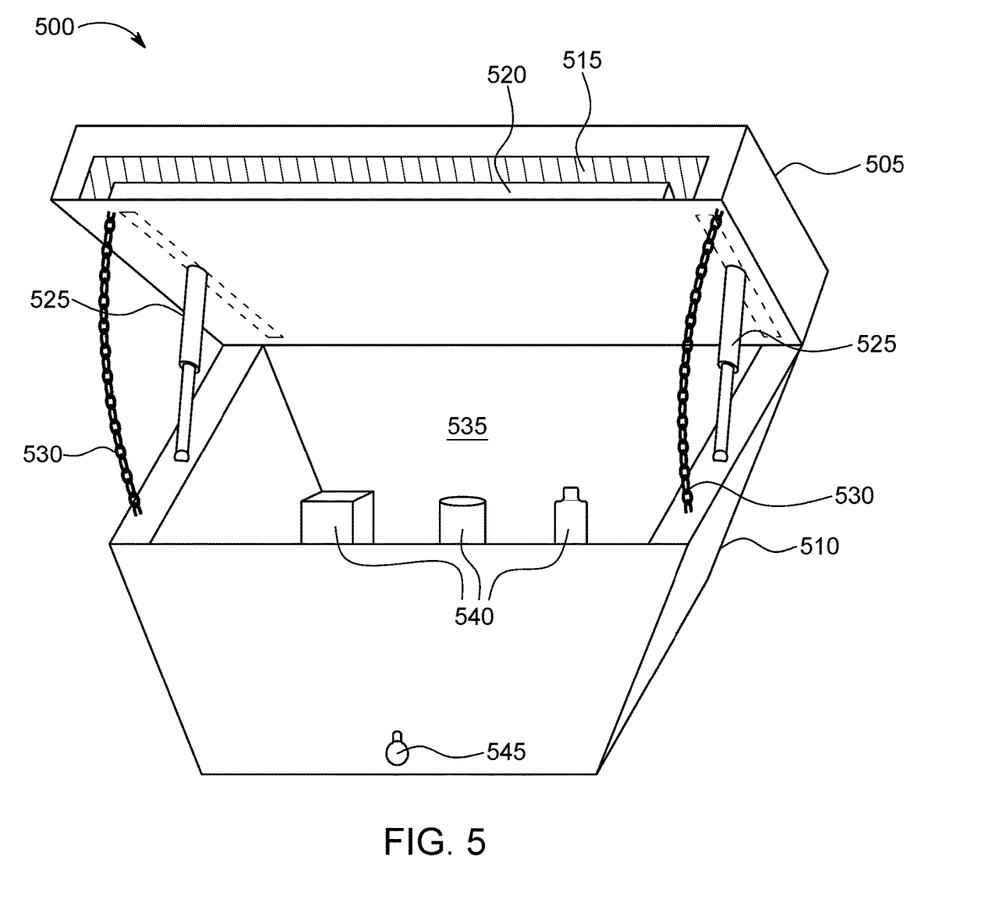
FIG. 5 depicts a perspective view of an exemplary storage container with a storage container lid configured to store multiple panels.

FIG. 5 depicts a perspective view of an exemplary storage container with a storage container lid configured to store multiple panels. A storage container 500 includes a lid 505 and a storage section 510. The lid 505 (like the lids 310 and 410 in FIGS. 3 and 4) has an opening 515 that is configured to receive panels 520. The lid 505 is pivotably coupled to the storage section 510. The lid 505 may be held in an open position using a number of mechanisms. As shown in FIG. 5, a pneumatic cylinder 525 may keep the lid 505 in an open position. Also shown in FIG. 5 are chains 530 that may keep the lid in an open position. In some examples, only one of the pneumatic cylinders 525 or the chains 530 may be present to keep the lid in an open position. In some examples, the pneumatic cylinder 525 may be a strut. In various embodiments, the chains 530 and/or the pneumatic cylinder 525 may be optional features. The chains 530 may act as a limiter that limits the lid 505 from opening past a certain angle.

Located inside of the storage section 510 is an insulated storage interior 535. The insulated storage interior 535 may store various items 540 that require thermal insulation (e.g., a bottled soft drink, ice cream, frozen pizza). Located on the storage section 510 is a drain plug 545 that may be opened to drain any liquid that may have accumulated inside of the insulated storage interior 535.

Figure 6A:
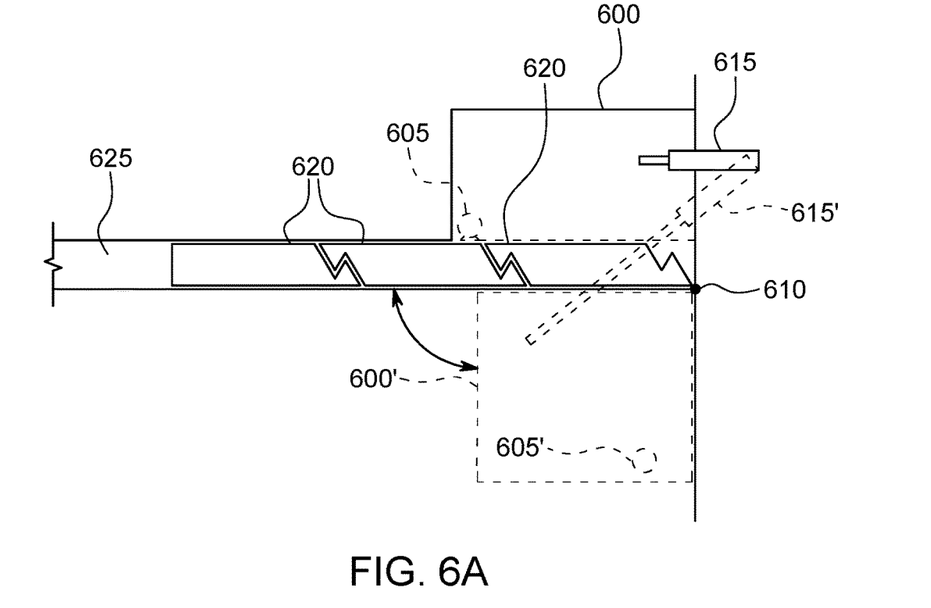
FIG. 6A depicts a side cross-sectional view of an exemplary panel storage system with a hinge connection point.

FIG. 6A depicts a side cross-sectional view of an exemplary panel storage system with a hinge connection point. A panel storage container 600 is configured to store panels that may be, for example, a cover for a truck bed. The panel storage container 600 is held in place by a locking pin inserted into a locking pin aperture 605. The panel storage container 600 is hingedly connected to a stable structure at a hinge point 610. With a locking pin inserted into the locking pin aperture 605, the panel storage container 600 may be prevented from pivoting about the hinge point 610. A biasing element 615 is coupled to the panel storage container 600. In the depicted embodiment, the biasing element 615 is a pneumatic cylinder. The biasing element 615 may be biased to force the panel storage container 600 in an upright position (e.g., position indicated by 600).

With the locking pin removed from the locking pin aperture 605, the panel storage container 600 may pivot downward to a stowed state 600'. The panel storage container in the stowed state 600' may be locked into position by inserting a locking pin into the locking pin aperture 605'. In the stowed state 600', the biasing element 615 may be in an extended state 615'. When a locking pin is removed from a locking pin aperture 605', the biasing element in the extended state 615' may slowly force the panel storage container 600' into the upright position 600.

While in the upright position, the panel storage container 600 may receive panels 620 into a hollow interior of the panel storage container 600. The panels 620 may stack in the same way as described earlier with respect to panels 430 in FIG. 4. The panels 620 may slide along a channel 625.

Figure 6B:
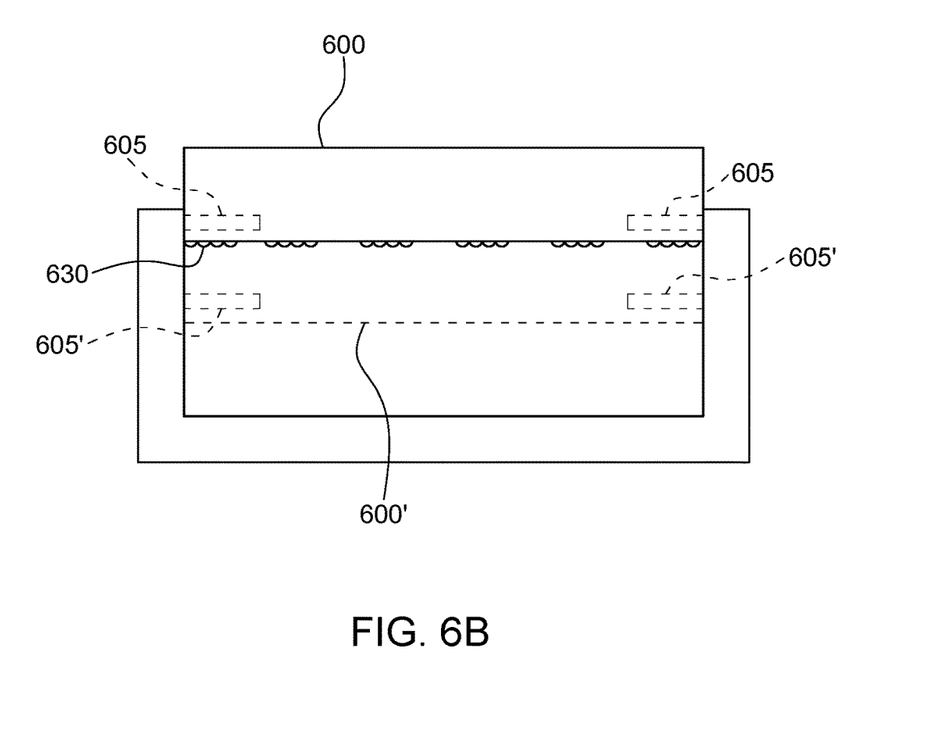
FIG. 6B depicts a back elevational view of an exemplary panel storage system with a hinge connection point.

FIG. 6B depicts a back elevational view of an exemplary panel storage system with a hinge connection point. A panel storage container 600, 600' is shown in an upright position 600 and in a stowed state 600'. In the upright position 600, pins inserted in the pin apertures 605 may retain the panel storage container in the upright position 600. In the stowed state 600', pins inserted in the pin apertures 605' may retain the panel storage container in the stowed state 600'. In this illustrative example, the panel storage container 600 is hingedly coupled to a vertical surface via spring hinges 630. The spring hinges 630 may be biased, such that the force of the spring hinges 630 may aid a user in raising the panel storage container to an upright position 600.

Figure 7:
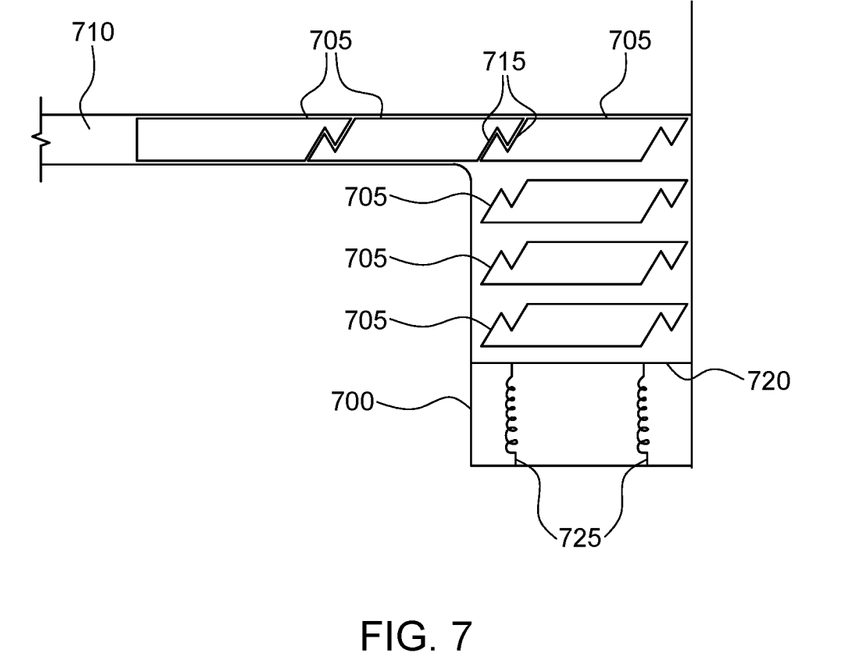
FIG. 7 depicts a side cross-sectional view of an exemplary panel storage system with a spring biased support surface.

FIG. 7 depicts a side cross-sectional view of an exemplary panel storage system with a spring biased support surface. A panel storage container 700 is configured to store panels that may be, for example, a cover for a truck bed. The panel storage container 700 may receive panels 705 into a hollow interior of the panel storage container 700. The panels 705 may slide along a channel 710 and into an opening in the panel storage container 700.

As the panels 705 slide inside of the panel storage container 700, interfaces 715 between consecutive panels 705 cause the panels to stack below one another inside of the panel storage container. More specifically, the right inclined section of the interface 715 of a first panel may force down the left section of a second (adjacent) panel, which may cause the second panel to be pushed down below the first panel in a stacking relationship. As the panels 705 are pushed into the panel storage container 700, each panel 705 stacks sequentially below the next panel, such that the panels 705 may be stored within the panel storage container 700.

To extract the panels 705 from the panel storage container 700, an end panel is initially pulled out of the panel storage container 700. As the end panel translates to the left inside of the channel 710 and out from above a panel stacked below the end panel (e.g., a "stacked panel"), the stacked panel may be forced up due to the force of a biased plate 720 acting on the stacked panel. The biased plate 720 may be supported by springs 725 that force the biased plate 720 upwards. Once the end panel has moved out from above the stacked panel, the interface 715 of the stacked panel may be raised into and mate with the interface 715 of the end panel, to couple the two panels with one another. This process repeats itself for consecutive panels, such that each panel that is moved out from above its corresponding stacked panel may couple with the previously stacked panel via the interfaces 715. This coupling between the interfaces 715 allows the panels to translate with one another within the channel 710.

Figure 8:
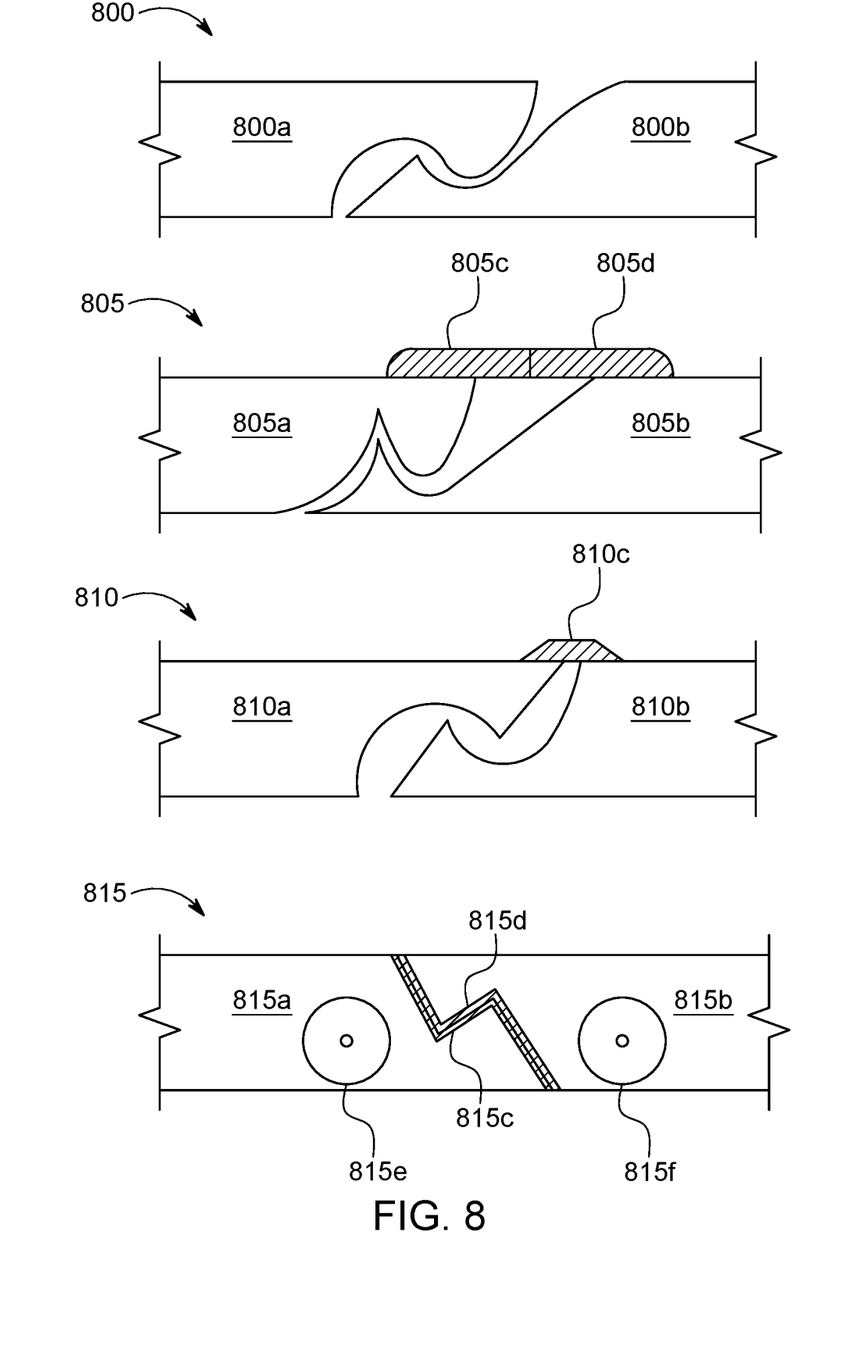
FIG. 8 depicts cross-sectional views of various exemplary panel mating interfaces.

FIG. 8 depicts cross-sectional views of various exemplary panel mating interfaces. A first panel mating interface 800 includes a left panel 800a and a right panel 800b. The left panel 800a includes a smoothed recess portion and a smoothed protruding portion. The right panel 800b includes a smoothed recess portion and a pointed protruding portion. The right panel 800b also includes a top-rounded section. The smoothed recess portion of the left panel 800a is configured to mate with the pointed protruding portion of the right panel 800b, while the smoothed recess portion of the right panel 800b is configured to mate with the smoothed protruding portion of the left panel 800a. The first panel mating interface 800 may allow adjacent panels to couple to one another, while also providing a mechanism through which an adjacent panel may be raised at one end to stack on top of (or below) another panel.

A second panel mating interface 805 includes a left panel 805a and a right panel 805b. The left panel 805a includes a pointed recess portion and a smoothed protruding portion. The right panel 805b includes a smoothed recess portion and a pointed protruding portion. The right panel 805b also includes a top chamfered section, which may advantageously provide for a smooth and gradual transition as the left panel 805a moves on top of the right panel 805b. The pointed recess portion of the left panel 805a is configured to mate with the pointed protruding portion of the right panel 805b, while the smoothed recess portion of the right panel 805b is configured to mate with the smoothed protruding portion of the left panel 805a. The second panel mating interface 805 may allow adjacent panels to couple to one another, while also providing a mechanism through which an adjacent panel may be raised at one end to stack on top of (or below) another panel. Each panel 805a, 805b also includes associated weatherproofing sections 805c, 805d that engage one another to make a water-tight seal when the interfaces of the panels 805a and 805b mate with one another.

A third panel mating interface 810 includes a left panel 810a and a right panel 810b. The left panel 810a includes a smoothed recess portion and a pointed protruding portion. The right panel 810b includes a smoothed recess portion and a pointed protruding portion. The smoothed recess portion of the left panel 810*a* is configured to mate with the pointed protruding portion of the right panel 810*b*, while the smoothed recess portion of the right panel 810*b* is configured to mate with the pointed protruding portion of the left panel 810*a*. The third panel mating interface 810 may allow adjacent panels to couple to one another, while also providing a mechanism through which an adjacent panel may be raised at one end to stack on top of (or below) another panel. Either panel 810*a*, 810*b* may include a weatherproofing sections 810*c* that engages a surface of the adjacent panel to make a water-tight seal when the interfaces of the panels 810*a* and 810*b* mate with one another.

A fourth panel mating interface 815 includes a left panel 815*a* and a right panel 815*b*. The left panel 815*a* includes a first linearly decreasing section, a linearly increasing section, and a second linearly decreasing section. The right panel 800*b* includes a first linearly decreasing section, a linearly increasing section, and a second linearly decreasing section. The first linearly decreasing section and the linearly increasing section of the left panel 815*a* meet to form an angled recess, while the linearly increasing section and the second linearly decreasing section of the left panel 815*a* meet to form an angled point. The first linearly decreasing section and the linearly increasing section of the right panel 815*b* meet to form an angled point, while the linearly increasing section and the second linearly decreasing section of the right panel 815*b* meet to form an angled recess. The first linearly decreasing section of the left panel 815*a* is configured to mate with the first linearly decreasing section of the right panel 815*b*, the linearly increasing section of the left panel 815*a* is configured to mate with the linearly increasing section of the right panel 815*b*, the second linearly decreasing section of the left panel 815*a* is configured to mate with the second linearly decreasing section of the right panel 815*b*, the angled recess of the left panel 815*a* is configured to mate with the angled point of the right panel 815*b*, and the angled point of the left panel 815*a* is configured to mate with the angled recess of the right panel 815*b*.

Located on the interface for the left panel 815*a* is a left panel weatherproofing section 815*c*, and similarly located on the interface for the right panel 815*b* is a right panel weatherproofing section 815*d*. Each weatherproofing section 815*c*, 815*d* engages one another to make a water-tight seal when the interfaces of the panels 815*a* and 815*b* mate with one another. Each panel 815*a*, 815*b* is shown it its associated roller 815*e*, 815*f* that facilitates smooth sliding action in a sliding channel (e.g., channel 435). The fourth panel mating interface 815 may allow adjacent panels to couple to one another, while also providing a mechanism through which an adjacent panel may be raised at one end to stack on top of (or below) another panel.

Although various embodiments have been described with reference to the Figures, other embodiments are possible. For example, the panels may be rectangular or square in shape. A trailing edge of one panel may have a mating interface that couples with the leading edge of an adjacent panel. The top of a panel may define a major surface, while the side of the panel may define a minor surface. The storage container may include a receptacle that may both stow panels in, and extract panels from, the receptacle.

In some examples, the panels may be about 1/8", 1/4", 1/2", 3/4", 1", 1.5", or about 2" in height or more. The panels may have a width that may be compatible with a width of a truck bed. For example, the width of the panels may be about 40", 45", 50", 55", 60", 65", 70", 75", 80", 85", 90", 95", or 100" or more. The length of the panels may be sized so that at least two panels may cover the entire length of a truck bed. For example, the length of the panels may be about 5", 10", 15", 20", 25", 30", 35", 40", 45", or about 50" or more. In some embodiments, the dimensions of individual panels may be different from other panels. For example, a first panel and a last panel may have longer lengths than an intermediate panel.

A protection apparatus may include a first panel having a first mating interface, the first panel extending laterally, being longitudinally rigid, and having opposing lateral ends configured to be guided in opposing channels extending in a longitudinal direction. A protection apparatus may include a second panel having a second mating interface configured to releasably couple with the first mating interface of the first panel, the second panel extending laterally, being longitudinally rigid, and having opposing lateral ends configured to be guided in opposing channels extending in the longitudinal direction. A protection apparatus may include a receiver module comprising a panel storage cavity and a laterally extending aperture, the laterally extending aperture being configured to receive the first and second panels into the panel storage cavity. A protection apparatus may include a storage container. In some examples, the receiver module may act as a lid of the storage container. In various examples, when the first and second panels translate longitudinally into the laterally extending aperture, the first mating interface may force up the second panel, such that the second panel stacks on top of the first panel inside the panel storage cavity. In some embodiments, when the first panel translates longitudinally out of the laterally extending aperture, the second panel may be forced down by gravity causing the second mating interface to be captured by the first mating interface, such that the first and second panels are configured to translate longitudinally with one another.

In some examples, a longitudinal cross section of the first mating interface may include a first linearly decreasing section, a first linearly increasing section, and a second linearly decreasing section. The first linearly decreasing section and the first linearly increasing section may meet to form a first angled recess, while the first linearly increasing section and the second linearly decreasing section may meet to form a first angled point.

In some embodiments, a longitudinal cross section of the second mating interface may include a third linearly decreasing section, a second linearly increasing section, and, a fourth linearly decreasing section. The third linearly decreasing section and the second linearly increasing section may meet to form a second angled point, while the second linearly increasing section and the fourth linearly decreasing section may meet to form a second angled recess. In various examples, when the first and the second panels are in a mating relationship, the first angled recess may be configured to mate with the second angled point, and the first angled point may be configured to mate with the second angled recess.

In some examples, the receiver module may include a solar panel disposed on a top surface of the receiver module. The receiver module may include a door of the laterally extending aperture configured to selectively close off access to the laterally extending aperture. The first and the second panels may each include opposing rollers located on the lateral ends of each of the first and second panels. The opposing rollers may be configured to roll longitudinally along the opposing channels extending in the longitudinal direction.

In some embodiment, the first and second mating interfaces may include associated weatherproofing that provides for a water-tight seal when the first and second mating interfaces are mated to one another. The receiver module may hingeably couple to the storage container. The storage container may include a drainplug. The storage container may include thermal insulation configured to thermally insulate items stored within the storage container. A pneumatic cylinder may be coupled to the storage container and the receiver module, such that the pneumatic cylinder is configured to support the receiver module in an upright open position.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A protection apparatus comprising:
   a first panel having a first mating interface, the first panel extending laterally, being longitudinally rigid, and having opposing lateral ends configured to be guided in opposing channels extending in a longitudinal direction;
   a second panel having a second mating interface configured to releasably couple with the first mating interface of the first panel, the second panel extending laterally, being longitudinally rigid, and having opposing lateral ends configured to be guided in opposing channels extending in the longitudinal direction;
   a receiver module comprising a panel storage cavity and a laterally extending aperture, the laterally extending aperture being configured to receive the first and second panels into the panel storage cavity; and,
   a storage container,
   wherein the receiver module acts as a lid of the storage container,
   wherein when the first and second panels translate longitudinally into the laterally extending aperture, the first mating interface forces up the second panel, such that the second panel stacks on top of the first panel inside the panel storage cavity,
   wherein when the first panel translates longitudinally out of the laterally extending aperture, the second panel is forced down by gravity causing the second mating interface to be captured by the first mating interface, such that the first and second panels are configured to translate longitudinally with one another.

2. The protection apparatus of claim 1:
   wherein a longitudinal cross section of the first mating interface comprises:
      a first linearly decreasing section;
      a first linearly increasing section; and,
      a second linearly decreasing section,
      wherein the first linearly decreasing section and the first linearly increasing section meet to form a first angled recess, and the first linearly increasing section and the second linearly decreasing section meet to form a first angled point, and,
   wherein a longitudinal cross section of the second mating interface comprises:
      a third linearly decreasing section;
      a second linearly increasing section; and,
      a fourth linearly decreasing section,
      wherein third linearly decreasing section and the second linearly increasing section meet to form a second angled point, and the second linearly increasing section and the fourth linearly decreasing section meet to form a second angled recess,
   wherein when the first and the second panels are in a mating relationship, the first angled recess is configured to mate with the second angled point, and the first angled point is configured to mate with the second angled recess.

3. The protection apparatus of claim 1, wherein the receiver module further comprises a solar panel disposed on a top surface of the receiver module.

4. The protection apparatus of claim 1, wherein the receiver module comprises a door of the laterally extending aperture configured to selectively close off access to the laterally extending aperture.

5. The protection apparatus of claim 1, wherein the first and the second panels each further comprise opposing rollers disposed on the lateral ends of each of the first and second panels, the opposing rollers configured to roll longitudinally along the opposing channels extending in the longitudinal direction.

6. The protection apparatus of claim 1, wherein the first and second mating interfaces comprise associated weatherproofing that provides for a water-tight seal when the first and second mating interfaces are mated to one another.

7. The protection apparatus of claim 1, wherein the receiver module is hingeably coupled to the storage container.

8. The protection apparatus of claim 1, wherein the storage container comprises a drainplug.

9. The protection apparatus of claim 1, wherein the storage container comprises thermal insulation configured to thermally insulate items stored within the storage container.

10. The protection apparatus of claim 1, further comprising a pneumatic cylinder coupled to the storage container and the receiver module, such that the pneumatic cylinder is configured to support the receiver module in an upright open position.

11. A protection apparatus comprising:
    a first panel having a first mating interface, the first panel extending laterally, being longitudinally rigid, and having opposing lateral ends configured to be guided in opposing channels extending in a longitudinal direction;
    a second panel having a second mating interface configured to releasably couple with the first mating interface of the first panel, the second panel extending laterally, being longitudinally rigid, and having opposing lateral ends configured to be guided in opposing channels extending in the longitudinal direction; and,
    a receiver module comprising a panel storage cavity and a laterally extending aperture, the laterally extending aperture being configured to receive the first and second panels into the panel storage cavity,
    wherein when the first and second panels translate longitudinally into the laterally extending aperture, the first mating interface forces up the second panel, such that the second panel stacks on top of the first panel inside the panel storage cavity,
    wherein when the first panel translates longitudinally out of the laterally extending aperture, the second panel is forced down by gravity causing the second mating interface to be captured by the first mating interface, such that the first and second panels are configured to translate longitudinally with one another, wherein a longitudinal cross section of the first mating interface comprises:
a first linearly decreasing section;
a first linearly increasing section; and,
a second linearly decreasing section,
wherein the first linearly decreasing section and the first linearly increasing section meet to form a first angled recess, and the first linearly increasing section and the second linearly decreasing section meet to form a first angled point, and,
wherein a longitudinal cross section of the second mating interface comprises:
a third linearly decreasing section;
a second linearly increasing section; and,
a fourth linearly decreasing section,
wherein third linearly decreasing section and the second linearly increasing section meet to form a second angled point, and the second linearly increasing section and the fourth linearly decreasing section meet to form a second angled recess,
wherein when the first and the second panels are in a mating relationship, the first angled recess is configured to mate with the second angled point, and the first angled point is configured to mate with the second angled recess.

12. The protection apparatus of claim 11, wherein the receiver module further comprises a solar panel disposed on a top surface of the receiver module.

13. The protection apparatus of claim 11, wherein the receiver module comprises a door of the laterally extending aperture configured to selectively close off access to the laterally extending aperture.

14. The protection apparatus of claim 11, wherein the first and the second panels each further comprise opposing rollers disposed on the lateral ends of each of the first and second panels, the opposing rollers configured to roll longitudinally along the opposing channels extending in the longitudinal direction.

15. The protection apparatus of claim 11, wherein the first and second mating interfaces comprise associated weatherproofing that provides for a water-tight seal when the first and second mating interfaces are mated to one another.

16. A protection apparatus comprising:
a first panel having a first coupling means, the first panel extending laterally, being longitudinally rigid, and having opposing lateral ends configured to be guided in opposing channels extending in a longitudinal direction;
a second panel having a second coupling means configured to releasably couple with the first coupling means of the first panel, the second panel extending laterally, being longitudinally rigid, and having opposing lateral ends configured to be guided in opposing channels extending in the longitudinal direction;
a receiver module comprising a panel storage cavity and a laterally extending aperture, the laterally extending aperture being configured to receive the first and second panels into the panel storage cavity; and,
a storage container,
wherein the receiver module acts as a lid of the storage container,
wherein when the first and second panels translate longitudinally into the laterally extending aperture, the first coupling means forces up the second panel, such that the second panel stacks on top of the first panel inside the panel storage cavity,
wherein when the first panel translates longitudinally out of the laterally extending aperture, the second panel is forced down by gravity causing the second coupling means to be captured by the first coupling means, such that the first and second panels are configured to translate longitudinally with one another.

17. The protection apparatus of claim 16, wherein the receiver module further comprises a solar panel disposed on a top surface of the receiver module.

18. The protection apparatus of claim 16, wherein the receiver module comprises a door of the laterally extending aperture configured to selectively close off access to the laterally extending aperture.

19. The protection apparatus of claim 16, wherein the first and the second panels each further comprise opposing rollers disposed on the lateral ends of each of the first and second panels, the opposing rollers configured to roll longitudinally along the opposing channels extending in the longitudinal direction.

* * * * *